United States Patent [19]

Lee

[11] Patent Number: 5,719,642

[45] Date of Patent: Feb. 17, 1998

[54] FULL-SEARCH BLOCK MATCHING MOTION ESTIMATION PROCESSOR

[75] Inventor: Chen-Yi Lee, Hsinchu, Taiwan

[73] Assignee: National Science Council of R.O.C., Taipei, Taiwan

[21] Appl. No.: 646,054

[22] Filed: May 7, 1996

[51] Int. Cl.$^6$ .................................................. H04N 7/24
[52] U.S. Cl. ........................................ 348/699; 348/716
[58] Field of Search ................................... 348/384, 390, 348/400–402, 405, 407, 409–413, 415, 416, 420, 699, 700, 714–716; 382/232, 236, 238; H04N 7/130, 7/137

[56] References Cited

U.S. PATENT DOCUMENTS

| | | | |
|---|---|---|---|
| 4,897,720 | 1/1990 | Wu et al. ................................ | 348/412 |
| 5,200,820 | 4/1993 | Gharavi . | |
| 5,315,388 | 5/1994 | Shen et al. ............................ | 348/714 |
| 5,357,287 | 10/1994 | Koo et al. . | |
| 5,416,522 | 5/1995 | Igarashi . | |

(List continued on next page.)

OTHER PUBLICATIONS

Array Architectures for Block Matching Algorithms, Komarek et al., IEEE Trans. Circuits and Systems, vol. 36, No. 10, Oct. 1989, pp. 1301–1308.

A VLSI Architecture for a Pel Recursive Motion Estimation Algorithm, Kim et al., IEE Trans. Circuits and Systems, vol. 36, No. 10, Oct. 1989, pp. 1291–1300.

Parameterizable VLSI Architectures for the Full-Search Block-Matching Algorithm, De Vos et al., IEEE Trans. Circuits and Systems, vol. 36, No. 10, Oct. 1989, pp. 1309–1316.

A Family of VLSI Designs for the Motion Compensation Block-Matching Algorithm, Yang, et al., IEEE Trans. Circuits and Systems, vol. 36(10). 1317–1325 (Oct. 1989).

VLSI Architecture for Block-Matching Motion Estimation Algorithm, IEEE Trans. Circuits and Systems For Video Technology, vol. 2, No. 2, Jun. 1992, pp. 169–175.

A Half-Pel Precision Motion Estimation Processor For NTSC-Resolution Video, Uramoto et al., IEEE 1993 Custom Integrated Circuits Conference, 4–1 Mizuhara, Itami, Hyogo, 664 Japan, pp. 11.2.1–11.2.4.

An Efficient Memory Architecture for Motion Estimation Processor Design, Tzeng IEEE International Symposium on Circuits and Systems, Seattle, Washington, pp. 712–715, Apr. 30–May 3, 1995.

Semi-Systolic Array Based Motion Estimation Processor Design, IEEE International Conference on Acoustics, Speech, and Signal Processing, Detroit, Michigan, May 9–12, 1995, pp. 3299–3302.

*Primary Examiner*—Richard Lee
*Attorney, Agent, or Firm*—Morgan & Finnegan, L.L.P.

[57] ABSTRACT

A full-search block matching motion estimation processor includes a memory management unit for buffering search data of a (2P+N)×(2P+N) search area, and a processor element array unit. The search area is divided into rows of the search data, and the memory management unit has N output bus lines and sequentially outputs the rows of the search data at the output bus lines. The processor element array unit includes an array of processor elements, each of which has at least one reference data input, at least one search data input connected to one of the search data inputs of the processor elements on the same row of the array and further connected to one of the output bus lines of the memory management unit, a partial sum output, and a partial sum input connected to the partial sum output of a preceding one of the processor elements on the same row of the array. Each of the processor elements includes at least one calculating unit for calculating a mean absolute difference between reference data at one of the reference data inputs and the search data at a corresponding one of the search data inputs, and an adder for adding the mean absolute difference from the calculating units to an input partial sum present at the partial sum input thereof so as to provide an output partial sum at the partial sum output thereof.

23 Claims, 10 Drawing Sheets

U.S. PATENT DOCUMENTS

| | | | |
|---|---|---|---|
| 5,430,886 | 7/1995 | Furtek . | |
| 5,453,799 | 9/1995 | Yang et al. . | |
| 5,512,962 | 4/1996 | Homma | 348/413 |
| 5,561,477 | 10/1996 | Polit | 348/700 |
| 5,568,203 | 10/1996 | Lee | 348/699 |
| 5,604,546 | 2/1997 | Iwata | 348/699 |
| 5,608,458 | 3/1997 | Chen et al. | 348/416 |
| 5,636,293 | 6/1997 | Lin et al. | 382/236 |

FIG.3 reference block:NXN,
search area;(2P+N)X(2P+N)
N=3,P=2

| cycle | PE127 | PE128 | PE129 |
|---|---|---|---|
| 1 | $\|R11-S11\|$ | | |
| 2 | $\|R11-S12\|$ | $\|R11-S11\|+\|R12-S12\|$ | |
| 3 | $\|R11-S13\|$ | $\|R11-S12\|+\|R12-S13\|$ | $\|R11-S11\|+\|R12-S12\|+\|R13-S13\|$ |
| 4 | $\|R11-S14\|$ | $\|R11-S13\|+\|R12-S14\|$ | $\|R11-S12\|+\|R12-S13\|+\|R13-S14\|$ |
| 5 | $\|R11-S15\|$ | $\|R11-S14\|+\|R12-S15\|$ | $\|R11-S13\|+\|R12-S14\|+\|R13-S15\|$ |
| 6 | $\|R11-S21\|$ | $\|R11-S15\|+\|R12-S16\|$ | $\|R11-S14\|+\|R12-S15\|+\|R13-S16\|$ |
| 7 | $\|R11-S22\|$ | $\|R11-S21\|+\|R12-S22\|$ | $\|R11-S15\|+\|R12-S16\|+\|R13-S17\|$ |
| 8 | $\|R11-S23\|$ | $\|R11-S22\|+\|R12-S23\|$ | $\|R11-S21\|+\|R12-S22\|+\|R13-S23\|$ |

Note: (1) only the processor elements of the third row are illustrated; and
(2) R and S represent reference and search data items, respectively.

FULL-SEARCH BLOCK MATCHING MOTION ESTIMATION PROCESSOR

BACKGROUND OF THE INVENTION

1. Field of the Invention

The invention relates to a motion estimation processor, more particularly to a full-search block matching motion estimation processor for achieving a hardware efficiency of up to 100%.

2. Description of the Related Art

Figure 1:
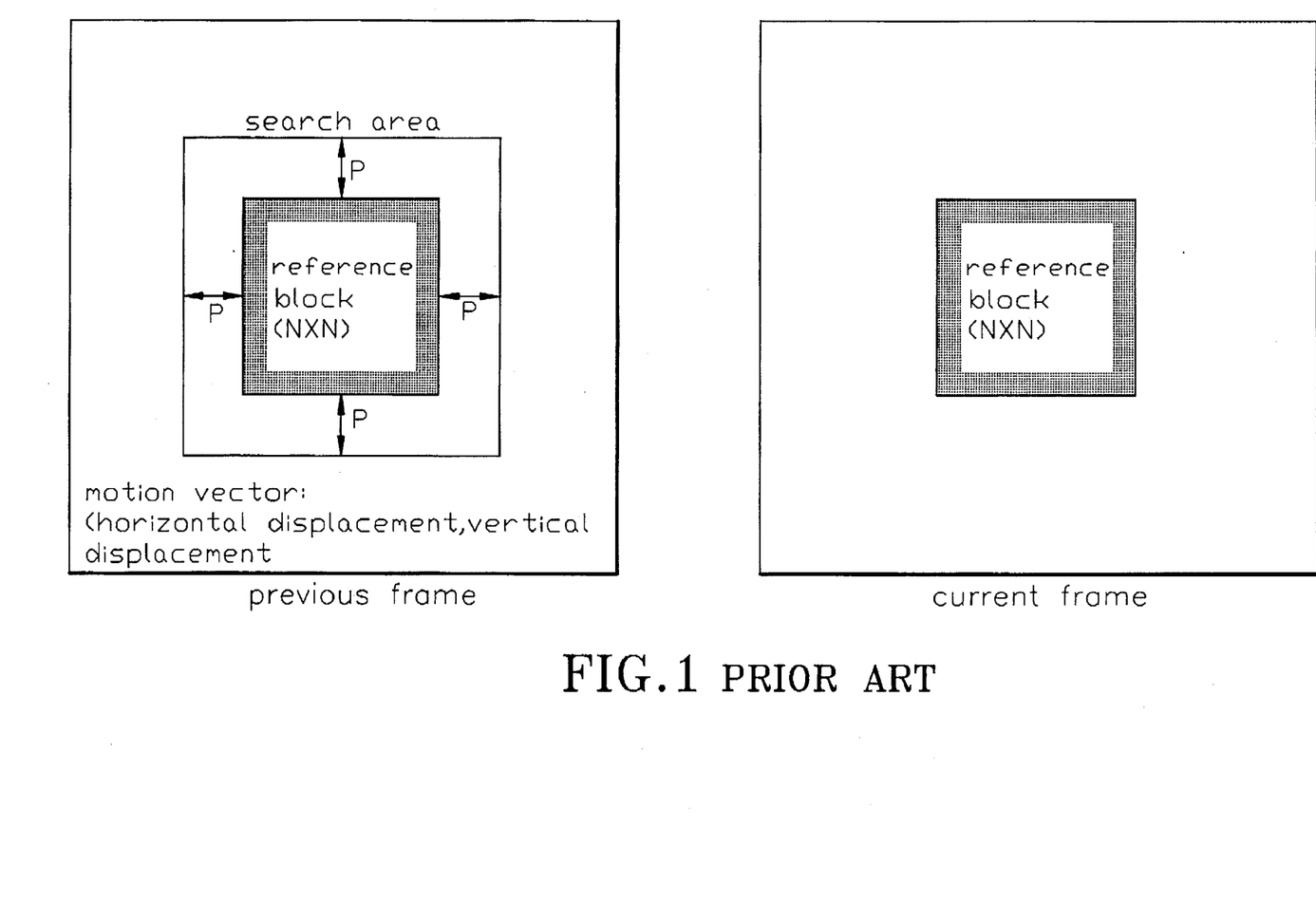
FIG. 1 illustrates the motion estimation process between an N×N reference block and candidate blocks of a $(2P+N)^2$ search area.

Video codecs for video phones and video conference systems have become available as a result of recent progress in video coding techniques. Motion estimation is one of the key components of high-compression video codecs. The most popular technique for motion estimation is the block matching algorithm (BMA) in view of its simple hardware implementation. However, the computational complexity inherent in BMA lies in the frame rate, the frame size, and the search area. For a typical BMA, as shown in FIG. 1, a current frame is divided into N×N blocks of pixels which are often referred to as reference blocks. Each reference block is compared with candidate blocks within a (N+2P)×(N+2P)-sized search area in a previous frame. P is the maximum displacement allowed in both horizontal and vertical directions. A motion vector is obtained from the displacement of the candidate block which has the least distortion among all of the candidate blocks within the search area. For MPEG2 main profile at main level, the frame rate and frame size are 30 and 720×480, respectively. The displacement (P) ranges from 4 to 1024. For practical applications, however, P is often limited to 16. Thus, $30 \times 720 \times 480 \times (2 \times 16+1)^2/N^2$ candidate blocks should be processed within 1 second. For each candidate block, since there are M×N pixels to be processed and each pixel normally requires three operations, i.e. subtract, absolute and accumulate, then at least 40.7 Giga operations are needed when N=16. This is obviously out of the range which current general-purpose or domain-specific processors can handle. Therefore, parallel processing techniques are in high demand for real-time performance in these cases.

Many architectural solutions for implementing BMA can be found in the literature. For example, T. Komarek and P. Pirsch, "Array Architectures for Block Matching Algorithms," IEEE Transactions on Circuits and Systems, vol. 36, No. 10, October 1989, pp. 1301–1308, L. De Vos and M. Stegherr, "Parameterizable VLSI Algorithm for the Full-Search Block-Matching Algorithm," IEEE Transactions on Circuits and Systems, Vol. 36, No. 10, October 1989, pp. 1309–1316, and K. M. Yang, M. T. Sun and L. Wu, "A Family of VLSI Designs for the Motion Compensation Block-Matching Algorithm," IEEE Transactions on Circuits and Systems, Vol. 36, No. 10, October 1989, pp. 1317–1325, concentrated on data flow within the processor element (PE) array. The systolic array approach has been highly exploited in VLSI implementation. However, this approach causes some problems in data flow outside the PE array. In other words, too much overhead on memory bandwidth is required to provide a scheduled data sequence to meet the needs of the PE array. A large number of I/O pins is thus needed, thereby resulting in a higher packaging cost. In addition, due to pipeline filling at the boundary portion of the search area and the long latency in data initialization, hardware efficiency, which can be expressed as $Eh=(2P+1/2P+N)^2$, is severely degraded. For example, if P=N=8, only 50% of the processor elements are working on the candidate blocks.

Although a snake-like data stream format which can reduce the memory bandwidth problem has been proposed in C. H. Hsieh and T. P. Lin, "VLSI Architecture for Block-Matching Motion Estimation Algorithm," IEEE Transactions on Circuits and Systems for Video Technology, Vol. 2, No. 2, June 1992, pp. 169–175, and in S. I. Uramoto, A. Takabatake, M. Suzuki, H. Sakurai and M. Yoshimoto, "A Half-Pel Precision Motion Estimation Processor for NTSC-Resolution Video," IEEE 1993 Custom Integrated Circuits Conference, San Diego, Calif., May 9–12, 1993, pp. 11.2.1–11.2.4, the hardware efficiency still remains very low.

Very few papers discuss the issue of reducing long latency in data initialization. Usually, it is assumed that both reference data and search data are available whenever needed. In practical applications, this is not true because such data come from either an imaging source or a buffer memory. For 2-D array implementation of motion estimation (ME) processors, data has to be initialized before all processor elements work on correct data items.

SUMMARY OF THE INVENTION

Therefore, the object of the present invention is to provide a full-search block matching motion estimation processor which uses a semi-systolic array based architecture to improve the low efficiency problem found in conventional systolic array based motion estimation processors. Instead of local connections for search data flow, global distribution of search data to each PE row is employed. The partial sum in each PE row is locally connected. A hardware efficiency of up to 100% can be achieved with the support of a dedicated memory management unit.

According to the present invention, a full-search block matching motion estimation processor comprises:

a memory management unit for buffering search data of a (2P+N)×(2P+N) search area, the search area being divided into rows of the search data, the memory management unit having N output bus lines and sequentially outputting the rows of the search data at the output bus lines;

a processor element array unit including an array of processor elements, each of the processor elements having at least one reference data input, at least one search data input connected to one of the search data inputs of the processor elements on the same row of the array and further connected to one of the output bus lines of the memory management unit, a partial sum output, and a partial sum input connected to the partial sum output of a preceding one of the processor elements on the same row of the array, each of the processor elements including at least one calculating means for calculating a mean absolute difference between reference data at one of the reference data inputs and the search data at a corresponding one of the search data inputs, and adding means for adding the mean absolute difference from the calculating means to an input partial sum present at the partial sum input thereof so as to provide an output partial sum at the partial sum output thereof, the processor elements in at least one of the rows of the array being capable of parallel processing two of the rows of the search data from the memory management unit;

an accumulator unit connected to each of the rows of the array, the accumulator unit adding together the output partial sum from a last one of the processor elements in each of the rows of the array to obtain a distortion output;

an output unit which is connected to the accumulator unit and which receives the distortion output from the accumulator unit, the output unit identifying a candidate block which has a least distortion among all of the candidate blocks in the search area, and outputting a motion vector corresponding to the identified candidate block; and a delay management unit which interconnects each of the rows of the array and the accumulator unit and which provides delay matching so that the accumulator unit can add together the output partial sum from the last one of the processor elements in each of the rows of the array in a correct sequence.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Systolic array (SA) is a good solution for processing large volumes of multi-dimensional data. It is also suitable for VLSI implementation due to locality, regularity and modularity. However, conventional SA architecture suffers from low hardware efficiency due to pipeline filling and data initialization. A semi-systolic array (SSA) architecture is thus provided to improve the low efficiency problem.

Figure 2:
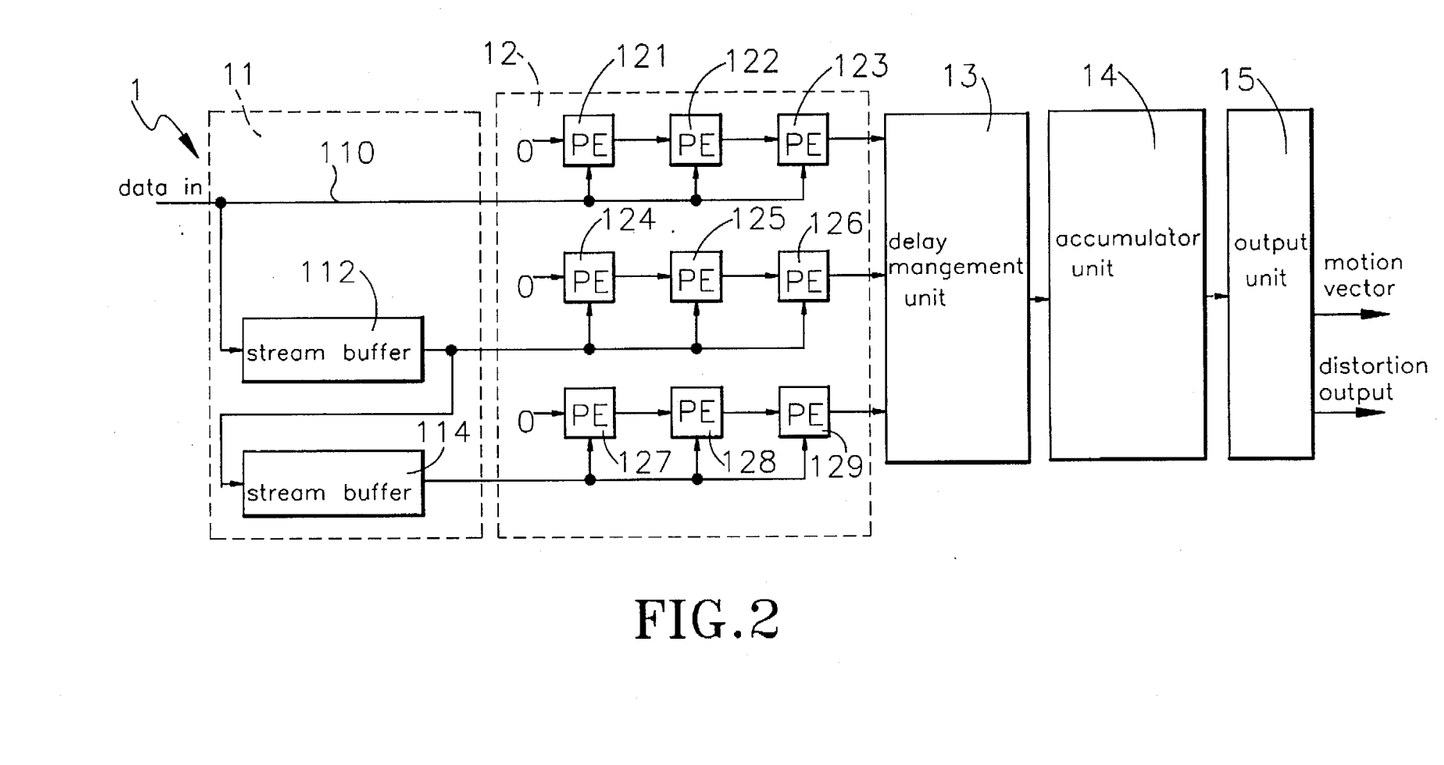
FIG. 2 is a schematic circuit block diagram of the first preferred embodiment of a semi-systolic array based full-search block matching motion estimation processor according to the present invention.

Referring to FIG. 2, the first preferred embodiment of a SSA-based full-search block matching motion estimation processor 1 according to the present invention is shown to include a memory management unit 11, a processor element (PE) array unit 12, a delay management unit 13, an accumulator unit 14 and an output unit 15.

Figure 3:
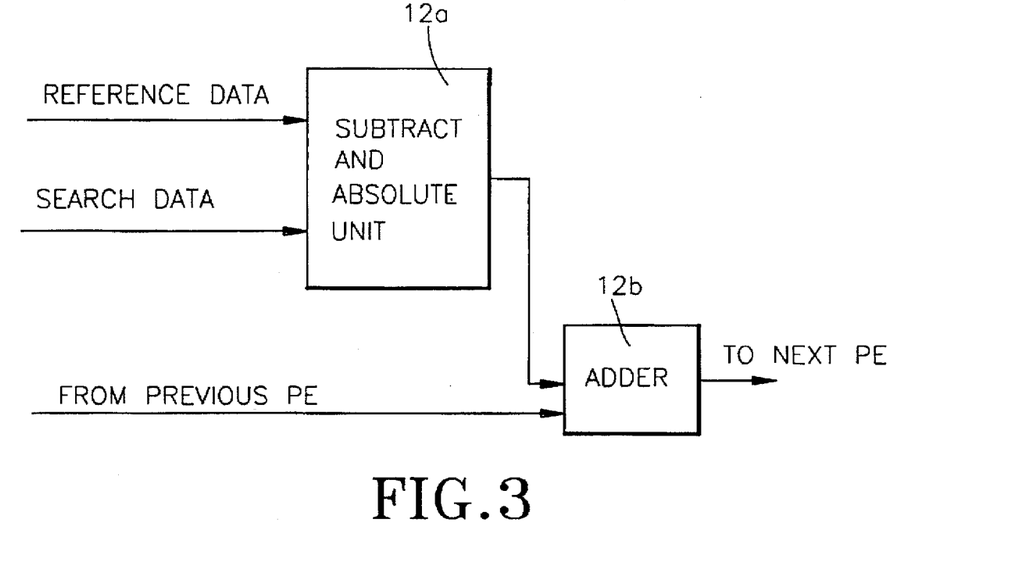
FIG. 3 is a schematic circuit block diagram of a processor element of the first preferred embodiment.

The PE array unit 12 includes an N×N array of processor elements and is capable of processing an N×N reference block. In this embodiment, the PE array unit 12 includes a 3×3 array of processor elements 121–129. As shown in FIG. 3, each processor element 121–129 includes a subtract and absolute unit 12a for calculating a mean absolute difference (MAD) between reference data and search data, and an adder 12b for adding the calculated MAD to an input partial sum from a preceding processor element 121–129. Thus, the connections used among the processor elements 121–129 are of two types—one is the broadcasting or global distribution type and the other is the local type. For the broadcasting type of connection, all processor elements 121–129 on the same row of the N×N array receive the same search data from the memory management unit 11. For the local type of connection, the partial sum from a preceding one of the processor elements 121–129 is fed to the succeeding one of the processor elements 121–129 on the same row of the N×N array for further processing.

The main difference between the SA and SSA architectures resides in the broadcasting of search data. Broadcasting is not employed in the SA architecture due to violation of locality. The broadcasting feature, however, is used to improve the hardware efficiency, as will be explained in greater detail hereinafter.

The memory management unit 11 is used to buffer the search data of a (2P+N)×(2P+N)-sized search area in order to minimize loading time. The search area is divided into rows of the search data, and the memory management unit 11 has N output bus lines and sequentially output the rows of the search data at the output bus lines. In this embodiment, the memory management unit 11 has a data bus 110 which is connected to search data inputs of the processor elements 121–123 on the first row of the PE array unit 12. The data bus 110 is further connected to an input of a first stream buffer 112 so that the search data on the data bus 110 can replace the search data stored in the first stream buffer 112. The output of the first stream buffer 112 is connected to the search data inputs of the processor elements 124–126 on the second row of the PE array unit 12. The output of the first stream buffer 112 is further connected to the input of a second stream buffer 114 so that the search data in the first stream buffer 112 can replace the search data stored in the second stream buffer 114. The output of the second stream buffer 114 is connected to the search data inputs of the processor elements 127–129 in the third row of the PE array unit 12. Thus, when the third row of search data is present at the data bus 110, the third row of search data replaces the second row of search data in the first stream buffer 112, while the second row of search data replaces the first row of search data in the second stream buffer 114.

The delay management unit 13, which is preferably in the form of a shift register array that interconnects each row of the PE array unit 12 and the accumulator unit 14, is responsible for delay matching of the partial sums calculated by each row of the PE array unit 12. The accumulator unit 14, which may be a parallel adder, adds the matched partial sums and provides a distortion output to the output unit 15. The output unit 15 includes a comparator (not shown) for identifying the candidate block which has the least distortion among all of the candidate blocks in the search area, and counters (not shown) which output the X and Y coordinates of the motion vector corresponding to the identified candidate block.

Figure 4:
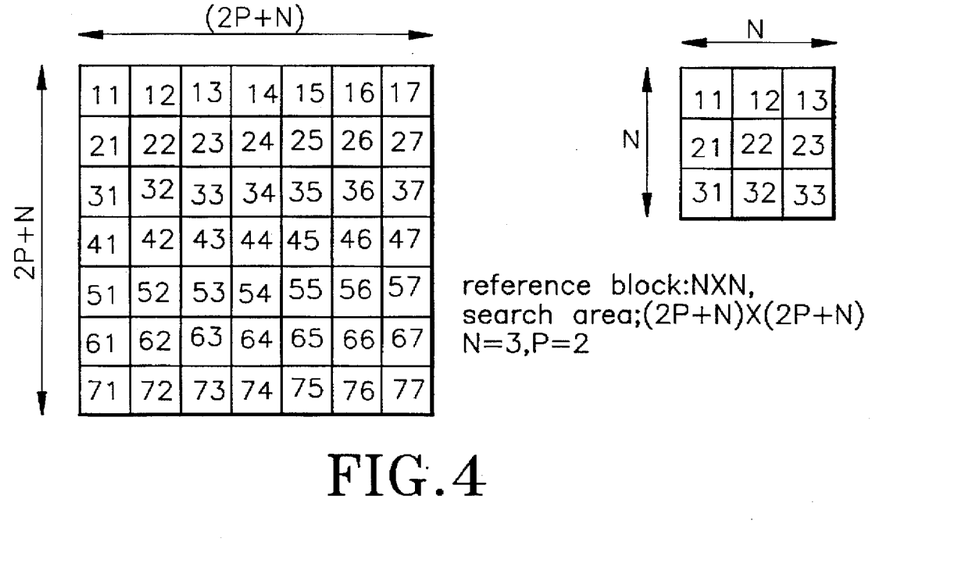
FIG. 4 illustrates a sample N×N reference block and a sample $(2P+N)^2$ search area to be processed by the motion estimation processor of this invention.

To illustrate the full search motion estimation operation of the first preferred embodiment, the 3×3 reference block is used with a 7×7 search area as shown in FIG. 4.

Figure 5:
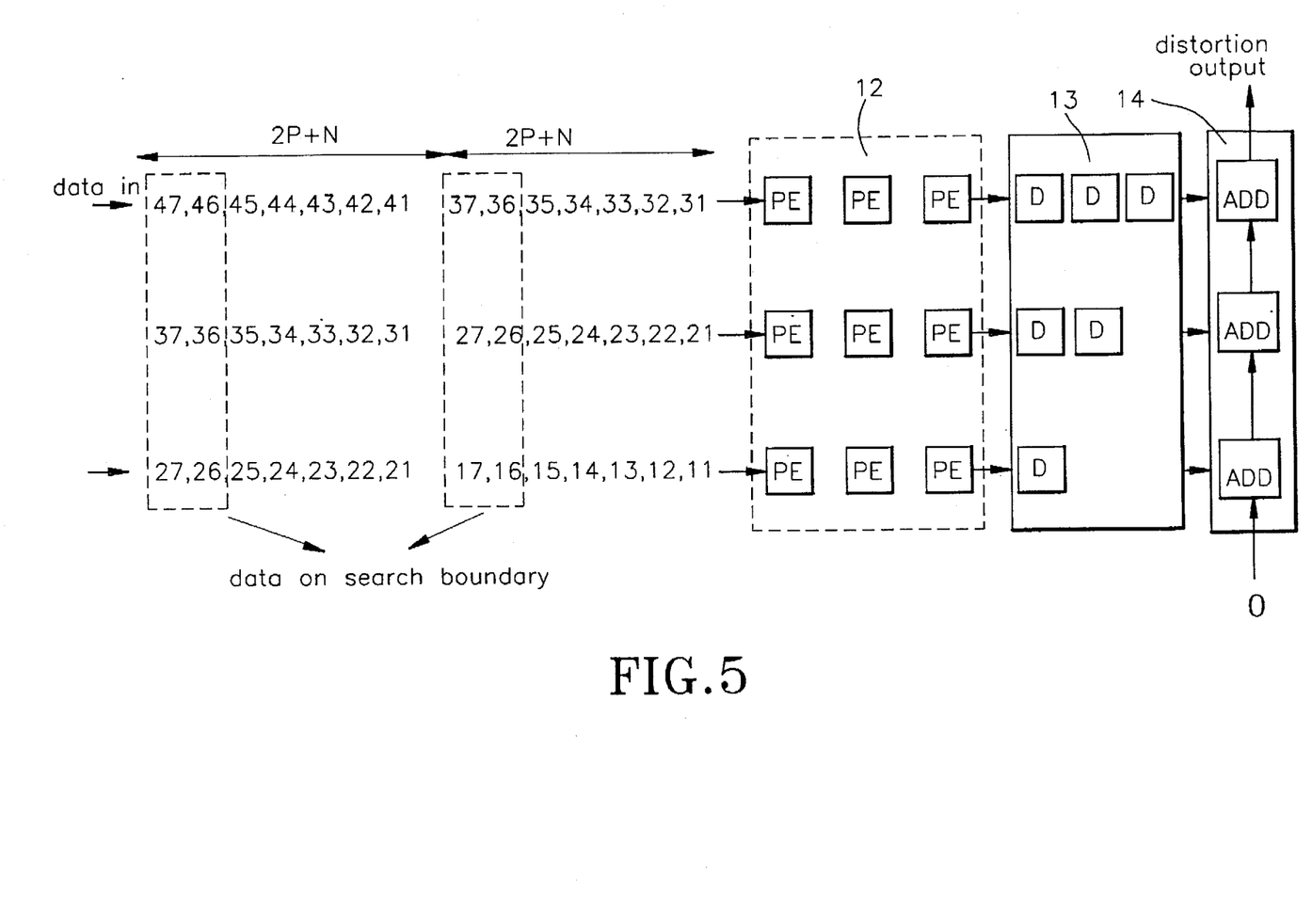
FIG. 5 illustrates how the search data of FIG. 4 is provided to the processor element array unit of the first preferred embodiment.

After the reference data have been stored in the processor elements 121–129, search data are pumped out from the memory management unit 11 and broadcast to the processor elements 121–129 in the aforementioned manner, thereby enabling the processor elements 121–129 to perform mean absolute difference (MAD) calculations and MAD accumulation, as shown in FIG. 5. With a latency of 8 cycles, the distortion value for the first candidate block can be obtained from the accumulator unit 14. The distortion values for the other candidate blocks are obtained sequentially thereafter.

Figure 6:
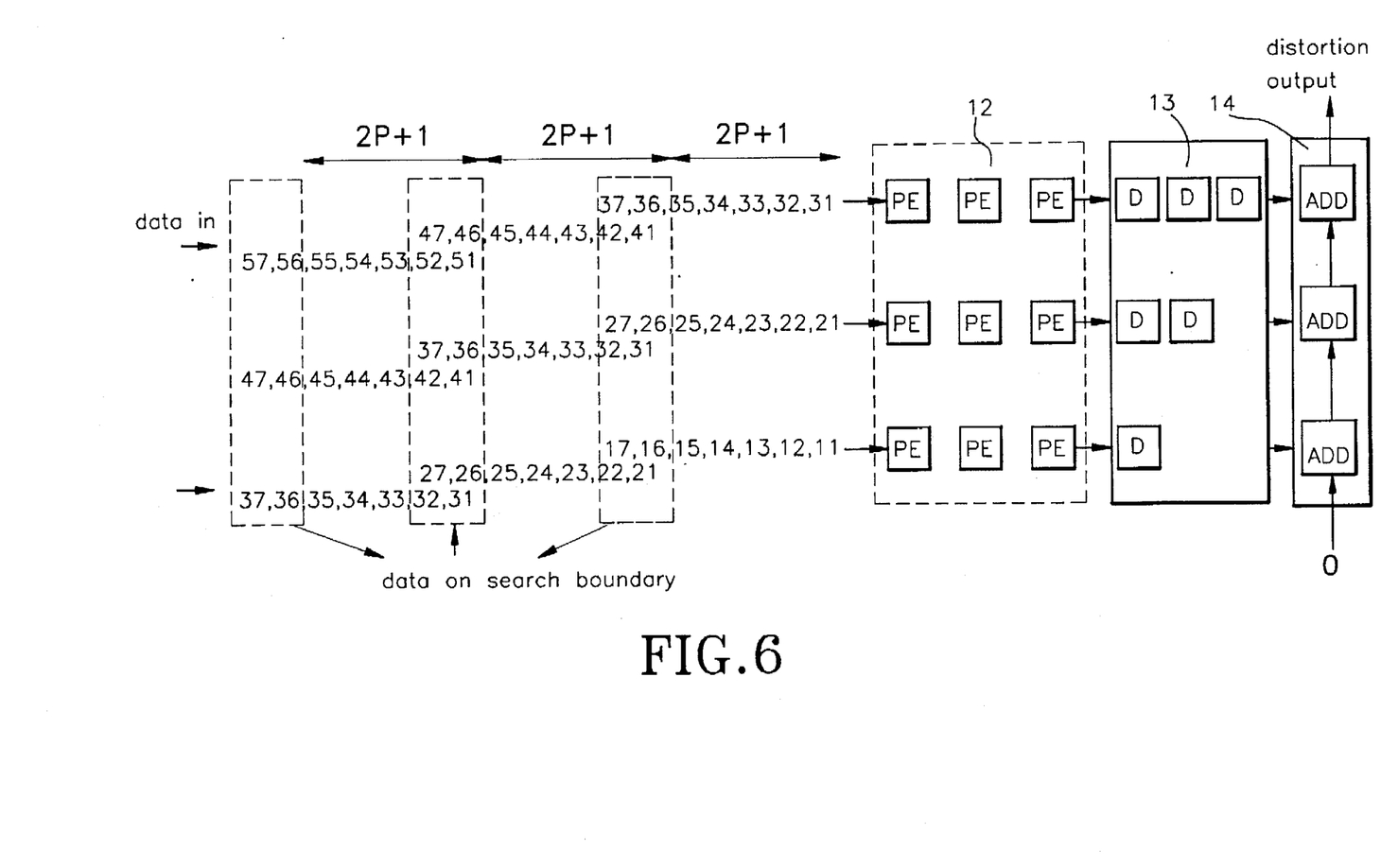
FIG. 6 illustrates how the search data of FIG. 4 is provided to the processor element array unit of the second preferred embodiment of a semi-systolic array based full-search block matching motion estimation processor according to the present invention.
Figure 7:
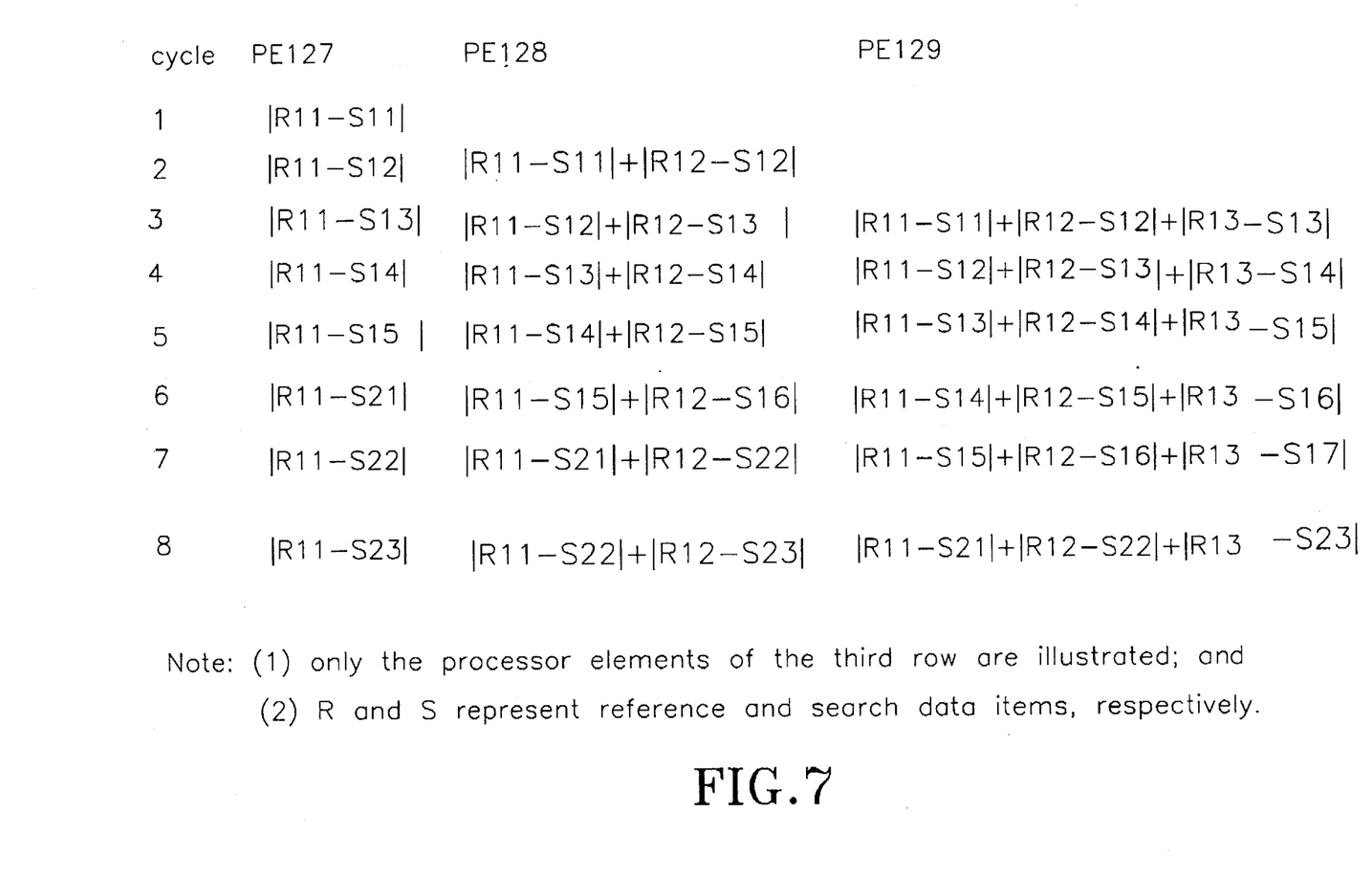
FIG. 7 is a table illustrating the operation of three processor elements of the processor element array unit of the second preferred embodiment.

It should be noted that, when the boundary portion of the search area is detected, some of the processor elements 121–129 become idle since search data of the next row have to be filled to the pipeline. In order to overcome this drawback, search data of the next row is preferably pre-loaded before the boundary portion is detected. As shown in FIG. 6, which illustrates the operation of a memory management unit of the second preferred embodiment, when the distortion value of a boundary candidate block is being calculated, the memory management unit feeds the search data of the next row into the PE array unit 12 at the next cycle. The overlapping regions indicate which search data should be simultaneously fed into the PE array unit 12. FIG. 7 illustrates the output partial sums of the processor elements 127–129 on the third row of the PE array unit 12. The output partial sums for the first, second and third candidate blocks are obtained at cycles 3, 4 and 5, respectively. Meanwhile, search area boundary is detected at cycle 5. At cycle 6, the boundary search data S16 is processed by the processor elements 128–129 while the processor element 127 processes the search data S21 of the nest row. At cycle 7, the boundary search data S17 is processed by the processor element 129 so as to obtain the distortion value of the boundary candidate block. In the meantime, the processor elements 127–128 process the search data S22 of the next row. At cycle 8, the search data S23 is fed to the processor elements 127–129. Therefore, the block matching algorithm can be mapped onto the semi-systolic array such that a 100% hardware efficiency, i.e. no idle operations are identified in the PE array unit 12, can be achieved.

Figure 8:
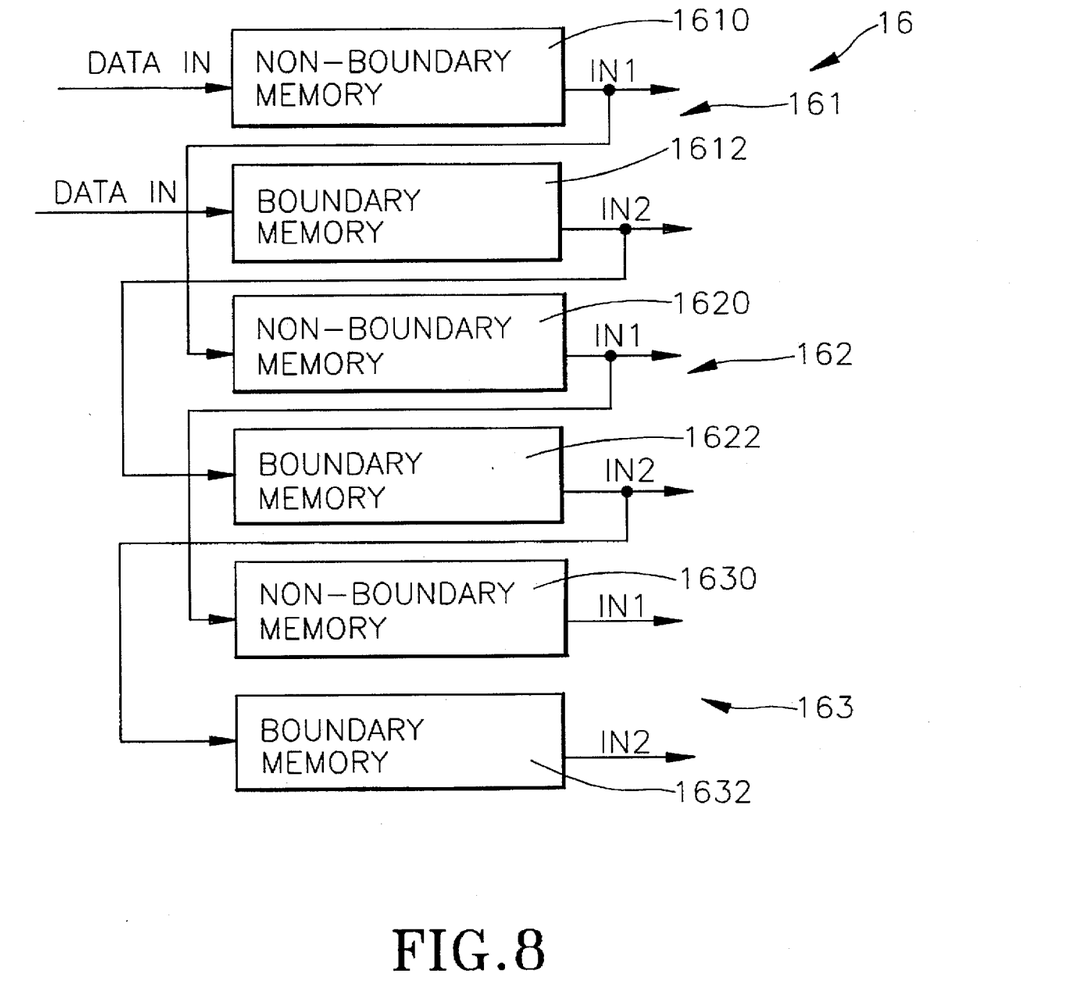
FIG. 8 is a schematic circuit block diagram of a memory management unit of the second preferred embodiment.

It has thus been shown that hardware efficiency can reach 100% if the desired data flow can be scheduled in advance. However, a dedicated memory management unit 16, such as that shown in FIG. 8, is needed to achieve this goal.

The memory management unit 16 of the second preferred embodiment of a motion estimation processor according to this invention includes three memory bank units 161, 162, 163 which provide the search data to the first, second and third rows of the PE array unit 12, respectively. Each of the memory bank units 161, 162, 163 has an input connected to the output of a preceding one of the memory bank units 161, 162, 163 so that the search data therein can be replaced by the search data in the preceding one of the memory bank units 161, 162, 163.

When candidate blocks are not within the boundary portion of the search area, only one single data stream is needed for all processor elements on the same row of the PE array unit 12. However, when a boundary candidate is detected, two data streams are needed. This implies the need for a two-read port memory for each of the memory bank units 161, 162, 163. In addition, the data items fetched from the current memory bank have to be loaded into the next memory bank. Therefore, a two-write port memory is also needed. As a result of these read/write considerations, each of the memory bank units 161, 162, 163 includes a first memory 1610, 1620, 1630 with a size of (N–1)×(2P+1) for non-boundary search data, and a second memory 1612, 1622, 1632 with a size of (N–1)×(N–1) for boundary data.

Figure 9:
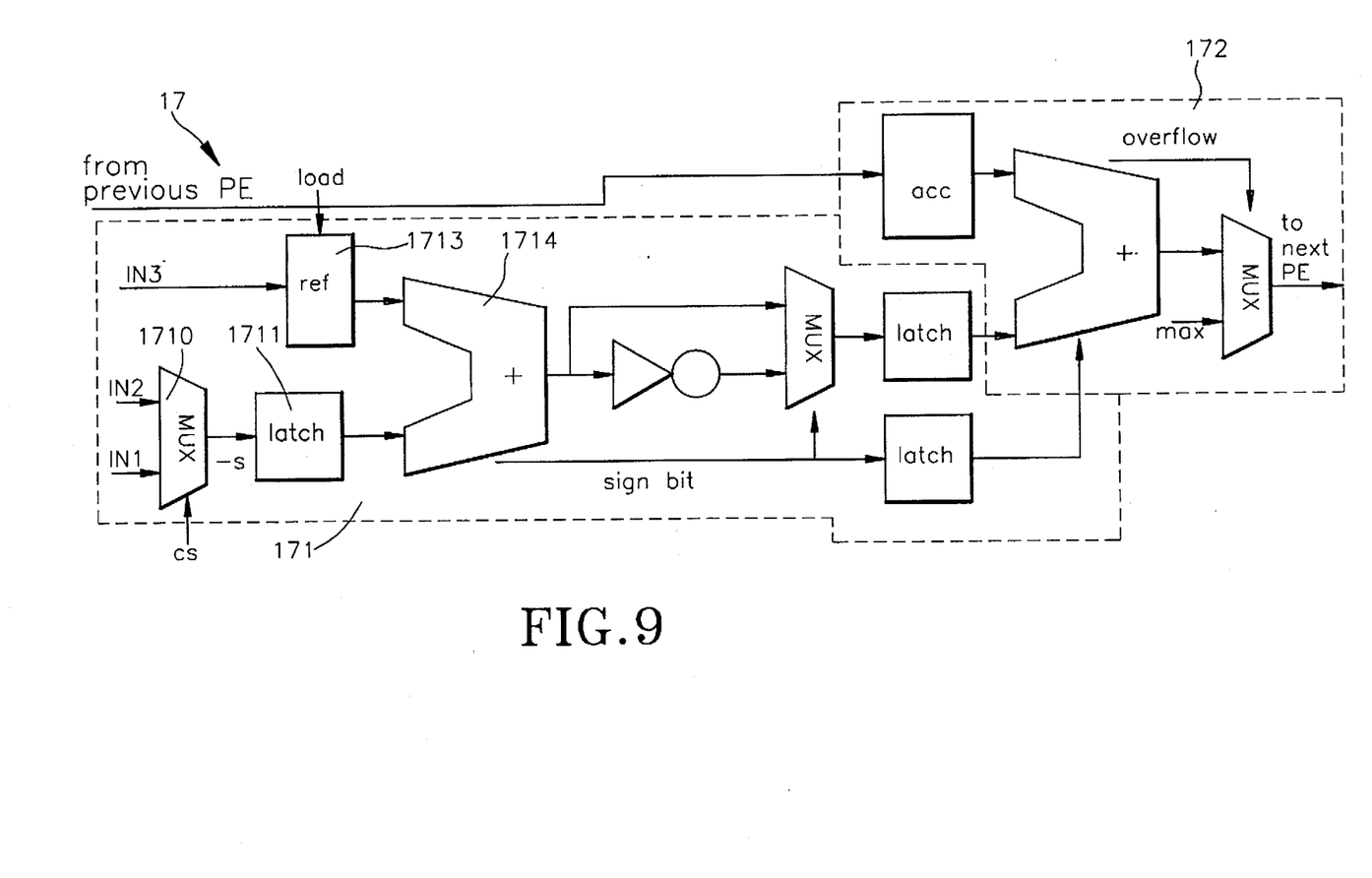
FIG. 9 is a schematic circuit diagram of a processor element of the second preferred embodiment.

FIG. 9 is a schematic circuit diagram of a processor element 17 for use with the memory management unit 16 of the second preferred embodiment. Three global data buses, IN1, IN2 and IN3, are over the processor element 17. The data buses IN1 and IN2 come respectively from the first and second memories of the corresponding one of the memory bank units 161, 162, 163. The data bus IN3 receives the reference data. The processor element 17 includes an add and absolute circuit 171 for calculating the mean absolute difference (MAD) between reference data and search data, and an adder 172 for adding the calculated MAD to the partial sum from a preceding processor element 17 on the same row of the PE array unit, Preferably, the adder 172 is provided with an overflow detector to limit the distortion value. The data buses IN1, IN2 are connected to a multiplexer unit 1710 that is controlled by a cs pointer. The output of the multiplexer unit 1710 is inverted before being loaded into a latch 1711. The data bus IN3 is connected to a register 1713. The contents of the register 1713 and the latch 1711 are added by an accumulator 1714, and the absolute value of the resulting sum is provided to the adder 172. Replacement of the subtract and absolute circuit 12a of the processor elements 121–129 in the first preferred embodiment by the add and absolute circuit 171 results in a smaller and simpler processor element.

In the initial phase, reference data, which may come from a reference data buffer (not shown), are loaded into the register 1713 simultaneous with the loading of the search data for the first candidate block of a search area. After N cycles, the reference data are stored in the PE array unit and can be used for the rest of the candidate blocks of the search area. The loading process for the reference data is controlled by a load pointer (load). The cs pointer is used to select the search data stream for the particular processor element 17 and can be controlled by read pointers (not shown) from the memory management unit 16.

Another problem which can cause idle operations within the PE array unit is data initialization. As mentioned beforehand, it was assumed that the reference data (N×N) and part of the search data (N–1)×(2P+N) have been pre-loaded into the PE array unit and the memory management unit, respectively. However, at (2P+1)$^2$ cycles, calculation of the distortion value for the last candidate block has been finished except for the latency inherent in pipeline delay. In order to fill in the memory management unit, all processor elements become idle for at least (N–1)*(2P+N) cycles.

Figure 10:
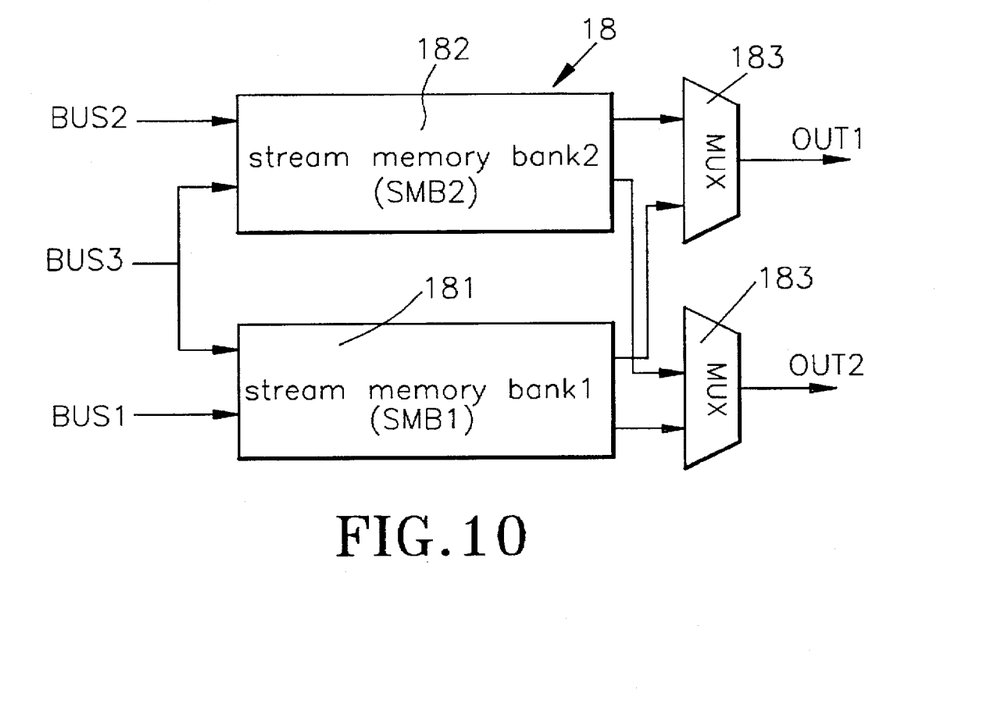
FIG. 10 is a schematic circuit block diagram of a memory bank unit used in the third preferred embodiment of a semi-systolic array based full-search block matching motion estimation processor of the present invention.

FIG. 10 illustrates a memory bank unit 18 used in the third preferred embodiment of a motion estimation processor of this invention. The memory bank unit 18 replaces each of the memory bank units 161, 162, 163 of the second preferred embodiment and includes identical first and second interleaving stream memory banks 181, 182 which work on different search areas. BUS1 at the input side of the first stream memory bank 181 receives the non-boundary search data of a current search area, BUS2 at the input side of the second stream memory bank 182 is used to pre-load the non-boundary search data of a succeeding search area, i.e. (N–1)×(2P+1), for calculating the next motion vector, while BUS3 at the input side of the first and second stream memory banks 181, 182 receives the boundary search data for the current and succeeding search areas such that the boundary search data for the current search area is stored in the second stream memory bank 182 while the boundary search data for the succeeding search area is stored in the first stream memory bank 181. Thus, once the calculation for the distortion value of the last candidate block of the current search area has been completed, multiplexers 183 at the output side of the first and second stream memory banks 181, 182 switch from the first stream memory bank 181 to the second stream memory bank 182 and vice versa for calculating the next motion vector if the next reference data is already available.

Figure 11:
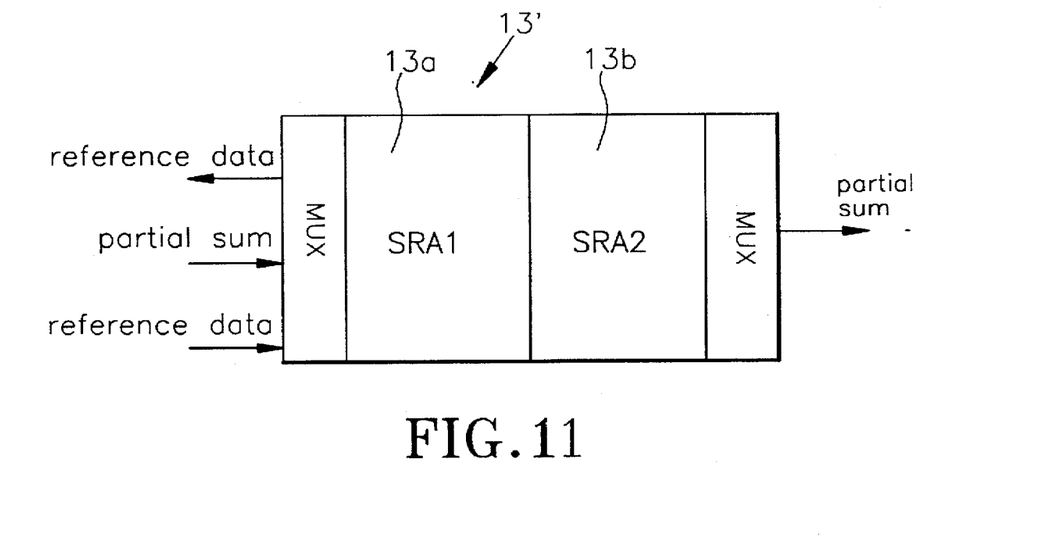
FIG. 11 is a schematic circuit block diagram of a delay management unit used in the fourth preferred embodiment of a semi-systolic array based full-search block matching motion estimation processor of this invention.

FIG. 11 illustrates a modified delay management unit 13' according to the fourth preferred embodiment of a motion estimation processor of the present invention. As mentioned beforehand, the delay management unit 13 of the first preferred embodiment includes a shift register array which is responsible for delay matching of the partial sums calculated by each row of the PE array unit. In general, when the shift register array is used merely for delay matching, only (N−1)×N/2 storage spaces are needed. However, this amount of storage space results in an irregular physical layout design. Although reference data may be provided by a reference data buffer, the reference data may be provided instead by a shift register array. Thus, the delay management unit 13' is modified so as to perform both matching of the partial sum sequence for obtaining the final distortion value and pre-loading of the reference data for the next motion vector.

The delay management unit 13' includes interleaved shift register arrays 13a, 13b so as to permit sharing between delay management and loading of reference data. While one of the shift register arrays 13a, 13b operates for delay matching, the other one of the shift register arrays 13a, 13b pre-loads the reference data for the next motion vector. The total memory space needed in the fourth preferred embodiment is 2(N−1)×(N+2P)+2(N×N), wherein the former part is for search data and the latter part is for both reference data and delay management.

The delay management units provide a delay which decreases in number of cycles from the first row to the last row of the PE array unit. Preferably, the first row of the PE array unit is subjected to a maximum delay of N cycles while the last row of the PE array unit is subjected to a minimum delay of 1 cycle. In this way, the partial sums produced in each row of the PE array unit can be summed by the accumulator unit in the correct sequence. In other words, the distortion value corresponding to one candidate block becomes available at the output of the accumulator unit after (2N+2) cycles. Although it takes N×N cycles to load the reference data into the shift register array, the loading process, however, can be done simultaneously with the calculation of the motion vectors.

Figure 12:
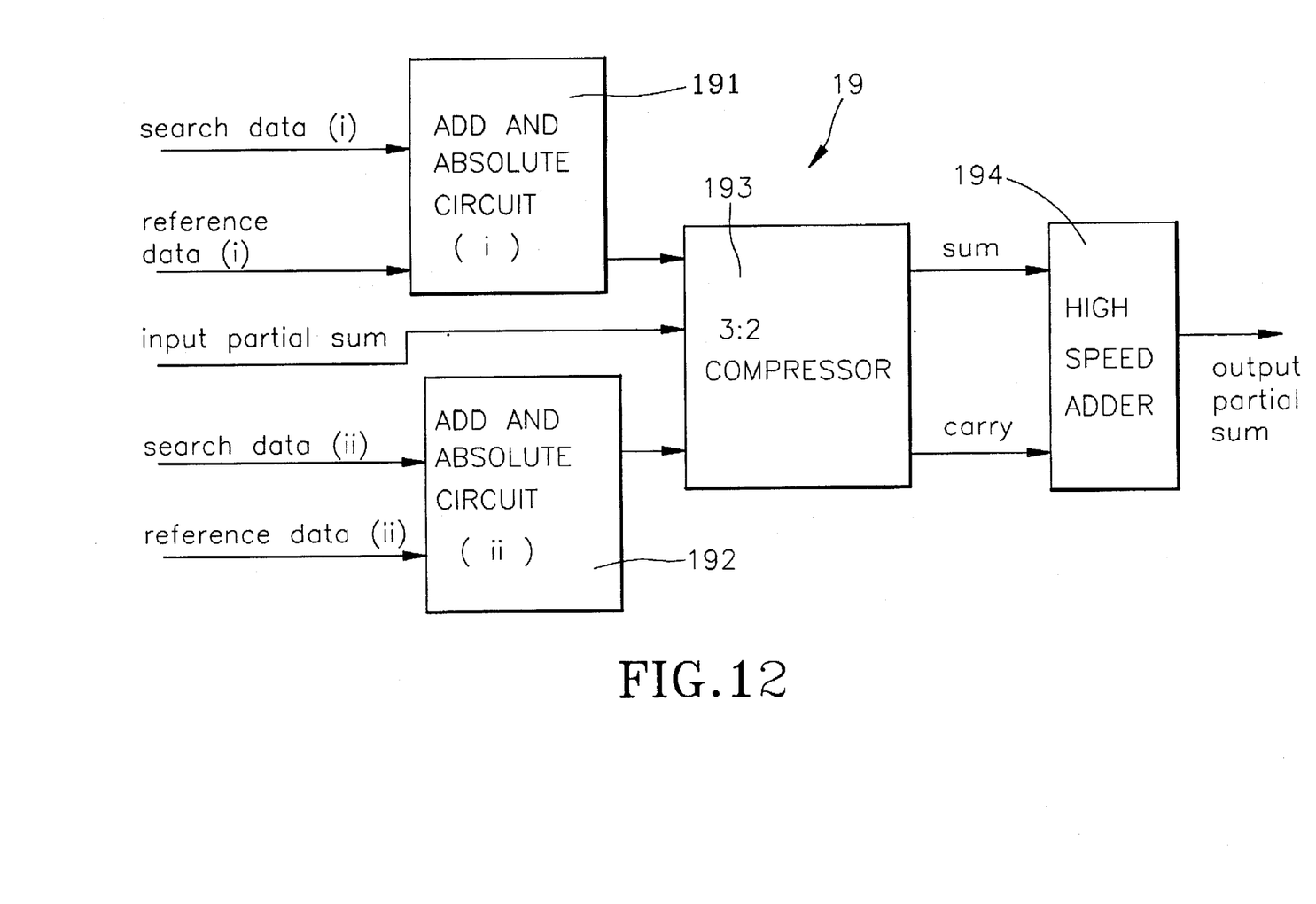
FIG. 12 is a schematic circuit block diagram of a processor element of the fifth preferred embodiment of a semi-systolic array based full-search block matching motion estimation processor of this invention.

FIG. 12 illustrates a processor element 19 to be used in the parallel processing of two rows of search data from the memory management unit. The processor element 19 includes first and second add and absolute circuits 191, 192, a 3:2 compressor 193 and a high speed adder 194. Each of the add and absolute circuits 191, 192 is responsible for calculating the mean absolute difference (MAD) between reference data at one of two rows of the reference block and search data at a corresponding one of two output bus lines of the memory management unit (not shown). The 3:2 compressor 193 is preferably a carry-save adder, such as a 1-bit full adder, which receives the MAD outputs of the add and absolute circuits 191, 192 and the input partial sum from a preceding processor element 19. The 3:2 compressor 193 generates sum and carry outputs which are processed by the high speed adder 194, such as a carry-lookahead adder, to obtain an output partial sum. At least one row of the processor elements 19 may be used in combination with at least one row of the processor elements of the previous embodiments to process a reference block with an odd or even number of rows. Since one row of the processor elements 19 can process two rows of the search data from the memory management unit at the same time, the total number of processor elements 19 for processing an N×N reference block can be reduced to result in further reduction in the size of the motion estimation processor of this invention.

With the use of the motion estimation processor of the present invention, it has been found that a motion vector can be produced every 256 cycles for a 23×23 search area and an 8×8 reference block. The number of required cycles is much less than that for conventional systolic array based motion estimation processors.

The advantages and characterizing features of the motion estimation processor of the present invention are as follows:

1. Optimal usage of the PE array unit—The efficiency of each processor element can reach up to 100% without idle operations.

2. Simple control flow—The required control signals are rather simple and can be easily derived. For example, the load signal used in each processor element is generated only when calculation for a new motion vector is requested.

3. Selection of different displacements (P)—This can be done by adjusting the read/write pointers of the memory management unit, where the cycle count for calculating each motion vector is $(2P)^2$ for a search range of $[-P, P-1]$.

4. Selection of different sizes of reference block—This can be done by adjusting the positions of the input ports of the memory management unit.

5. Minimum memory bandwidth requirement so that the number of I/O pins can be reduced—Both the reference and search data are accessed once and buffered internally for the required operations.

It has thus been shown that the motion estimation processor of the present invention is capable of optimally implementing a full-search motion estimation algorithm. The motion estimation processor mainly comprises a PE array unit with a semi-systolic array structure for computational power and a memory management unit which offers a scheduled data flow so that 100% hardware efficiency within the PE array unit can be achieved. In addition, the motion estimation processor is also flexible with regards to the sizes of the reference and search blocks. The motion estimation processor is thus feasible for handling video coding applications based on the motion estimation method, such as in HDTV applications.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A full-search block matching motion estimation processor, comprising:

a memory management unit for buffering search data of a (2P+N)×(2P+N) search area, the search area being divided into rows of the search data, said memory management unit having N output bus lines and sequentially outputting the rows of the search data at said output bus lines;

a processor element array unit including an array of processor elements, each of said processor elements having at least one reference data input, at least one search data input connected to one of search data inputs of said processor elements on the same row of said array and further connected to one of said output bus lines of said memory management unit, a partial sum output, and a partial sum input connected to said partial sum output of a preceding one of said processor elements on the same row of said array, each of said processor elements including at least one calculating means for calculating a mean absolute difference between reference data at said reference data input and the search data at a corresponding one of said search data inputs, and adding means for adding the mean absolute difference from said calculating means to an input partial sum present at said partial sum input thereof so as to provide an output partial sum at said partial sum output thereof, said processor elements in at least one of the rows of said array being capable of parallel processing two of the rows of the search data from said memory management unit; and wherein said processor elements in said at least one of the rows of said array including first and second ones of said calculating means, a 3:2 compressor receiving said mean absolute difference from said first and second ones of said calculating means and said input partial sum, and a high speed adder receiving sum and carry outputs of said 3:2 compressor, said 3:2 compressor and said high speed adder serving as said adding means which provides said output partial sum.

2. The full-search block matching motion estimation processor as claimed in claim 1, wherein said memory management unit comprises:

a data bus serving as a first one of said output bus lines; and (N−1) stream buffers serving as remaining ones of said output bus lines, a first one of said stream buffers having an input connected to said data bus so that the search data in said data bus can replace the search data in said first one of said stream buffers, second to (N−1)th ones of said stream buffers having an input connected to output of a preceding one of said stream buffers so that the search data therein can be replaced by the search data in the preceding one of said stream buffers.

3. The full-search block matching motion estimation processor as claimed in claim 1, wherein said high speed adder includes a carry-lookahead adder.

4. The full-search block matching motion estimation processor as claimed in claim 1, wherein said 3:2 compressor includes a carry-save adder.

5. The full-search block matching motion estimation processor as claimed in claim 4, wherein said carry-save adder is a 1-bit full adder.

6. The full-search block matching motion estimation processor as claimed in claim 1, wherein said memory management unit comprises N memory bank unite serving as said output bus lines, each of said memory bank units having an input connected to output of a preceding one of said memory bank units so that the search data therein can be replaced by the search data in the preceding one of said memory bank units.

7. The full-search block matching motion estimation processor as claimed in claim 6, wherein each of said memory bank units includes a first memory with a size of $(N-1) \times (2P+1)$ for non-boundary search data and a second memory with a size of $(N-1) \times (N-1)$ for boundary search data, said first and second memories simultaneously providing the non-boundary search data of a succeeding one of the rows of the search data and the boundary search data of a current one of the rows of the search data to said array when distortion for a candidate block that is within a boundary portion of the search area is being calculated.

8. The full-search block matching motion estimation processor as claimed in claim 7, wherein said calculating means of each of said processor elements includes a multiplexer unit which receives the non-boundary search data of the succeeding one of the rows of the search data and the boundary search data of the current one of the rows of the search data from said first and second memories of one of said memory bank units and which is operable so as to select one of the non-boundary search data and the boundary search data.

9. The full-search block matching motion estimation processor as claimed in claim 6, wherein each of said memory bank units includes interleaved first and second stream memory banks, said first stream memory bank storing non-boundary search data of a current search area and boundary search data of a succeeding search area, said second stream memory bank storing boundary search data of the current search area and non-boundary search data of the succeeding search area, each of said memory bank units further including multiplexer means connected to said first and second stream memory banks and operable so as to simultaneously provide one of the non-boundary search data and one of the boundary search data to said array.

10. The full-search block matching motion estimation processor as claimed in claim 9, wherein said calculating means of each of said processor elements includes a multiplexer unit which receives said one of the non-boundary search data and said one of the boundary search data from said multiplexer means of one of said memory bank units.

11. The full-search block matching motion estimation processor as claimed in claim 1, further comprising an accumulator unit connected to each of the rows of said array, said accumulator unit adding together said output partial sum from a last one of said processor elements in each of the rows of said array to obtain a distortion output.

12. The full-search block matching motion estimation processor as claimed in claim 11, further comprising an output unit which is connected to said accumulator unit and which receives said distortion output from said accumulator unit, said output unit identifying a candidate block which has a least distortion among all of the candidate blocks in the search area, and outputting a motion vector corresponding to the identified candidate block.

13. The full-search block matching motion estimation processor as claimed in claim 11, further comprising a delay management unit which interconnects each of the rows of said array and said accumulator unit and which provides delay matching so that said accumulator unit can add together said output partial sum from the last one of said processor elements in each of the rows of said array in a correct sequence.

14. The full-search block matching motion estimation processor as claimed in claim 13, wherein said delay management unit provides a delay which decreases in number of cycles from a first one of the rows of said array to a last one of the rows of said array.

15. The full-search block matching motion estimation processor as claimed in claim 13, wherein said delay management unit comprises a shift register array interconnecting each of the rows of said array and said accumulator unit.

16. The full-search block matching motion estimation processor as claimed in claim 13, wherein said delay management unit comprises interleaved shift register arrays interconnecting each of the rows of said array and said accumulator unit, said shift register arrays being further connected to said reference data input of said processor elements for loading the reference data therein.

17. A full-search block matching motion estimation processor, comprising:

a memory management unit for buffering search data of a (2P+N)×(2P+N) search area, the search area being divided into rows of the search data, said memory management unit having N output bus lines and sequentially outputting the rows of the search data at said output bus lines;

a processor element array unit including an N×N array of processor elements, each of said processor elements having a reference data input, a search data input connected to search data inputs of said processor elements on the same row of said N×N array and further connected to one of said output bus lines of said memory management unit, a partial sum output, and a partial sum input connected to said partial sum output of a preceding one of said processor elements on the same row of said N×N array, each of said processor elements including calculating means for calculating a mean absolute difference between reference data at said reference data input and the search data at said search data input, and adding means for adding the mean absolute difference from said calculating means to an input partial sum present at said partial sum input thereof so as to provide an output partial sum at said partial sum output thereof;

wherein said processor elements in the rows of said N×N array including first and second ones of said calculating means, a 3:2 compressor receiving said mean absolute difference from said first and second ones of said calculating means and said input partial sum, and a high speed adder receiving sum and carry outputs of said 3:2 compressor, said 3:2 compressor and said high speed adder serving as said adding means which provides said output partial sum an accumulator unit connected to each of the rows of said N×N array, said accumulator unit adding together said output partial sum from a last one of said processor elements in each of the rows of said N×N array to obtain a distortion output; and a delay management unit which interconnects each of the rows of said N×N array and said accumulator unit and which provides delay matching so that said accumulator unit can add together said output partial sum from the last one of said processor elements in each of the rows of said N×N array in a correct sequence, said delay management unit providing a delay which decreases in number of cycles from a first one of the rows of said N×N array to a last one of the rows of said N×N array.

18. The full-search block matching motion estimation processor is claimed in claim 17, wherein said delay management unit provides a maximum delay of N cycles to the first one of the rows of said N×N array and a minimum delay of 1 cycle to the last one of the rows of said N×N array.

19. The full-search block matching motion estimation processor as claimed in claim 17, further comprising an output unit which is connected to said accumulator unit and which receives said distortion output from said accumulator unit, said output unit identifying a candidate block which has a least distortion among all of the candidate blocks in the search area, and outputting a motion vector corresponding to the identified candidate block.

20. The full-search block matching motion estimation processor as claimed in claim 17, wherein said delay management unit comprises a shift register array interconnecting each of the rows of said N×N array and said accumulator unit.

21. A full-search block matching motion estimation processor, comprising:

a memory management unit for buffering search data of a (2P+N)×(2P+N) search area, the search area being divided into rows of the search data, said memory management unit having N output bus lines and sequentially outputting the rows of the search data at said output bus lines;

a processor element array unit including an N×N array of processor elements, each of said processor elements having a reference data input, a search data input connected to search data inputs of said processor elements on the same row of said N×N array and further connected to one of said output bus lines of said memory management unit, a partial sum output, and a partial sum input connected to said partial sum output of a preceding one of said processor elements on the same row of said N×N array, each of said processor elements including calculating means for calculating a mean absolute difference between reference data at said reference data input and the search data at said search data input, and adding means for adding the mean absolute difference from said calculating means to an input partial sum present at said partial sum input thereof so as to provide an output partial sum at said partial sum output thereof;

wherein said processor elements in the rows of said N×N array including first and second ones of said calculating means, a 3:2 compressor receiving said mean absolute difference from said first and second ones of said calculating means and said input partial sum, and a high speed adder receiving sum and carry outputs of said 3:2 compressor, said 3:2 compressor and said high speed adder serving as said adding means which provides said output partial sum an accumulator unit connected to each of the rows of said N×N array, said accumulator unit adding together said output partial sum from a last one of said processor elements in each of the rows of said N×N array to obtain a distortion output; and a delay management unit which interconnects each of the rows of said N×N array and said accumulator unit and which provides delay matching so that said accumulator unit can add together said output partial sum from the last one of said processor elements in each of the rows of said N×N array in a correct sequence, said delay management unit including interleaved shift register arrays interconnecting each of the rows of said N×N array and said accumulator unit, said shift register arrays being further connected to said reference data input of said processor elements for loading the reference data therein.

22. A full-search block matching motion estimation processor, comprising:

a memory management unit for buffering search data of a (2P+N)×(2P+N) search area, the search area being divided into rows of the search data, said memory management unit having N output bus lines and sequentially outputting the rows of the search data at said output bus lines; and a processor element array unit including an N×N array of processor elements, each of said processor elements having a reference data input, a search data input connected to search data inputs of said processor elements on the same row of said N×N array and further connected to one of said output bus lines of said memory management unit, a partial sum output, and a partial sum input connected to said partial sum output of a preceding one of said processor elements on the same row of said N×N array, each of said processor elements including calculating means for calculating a mean absolute difference between reference data at said reference data input and the search data at said search data input, and adding means for adding the mean absolute difference from said calculating means to an input partial sum present at said partial sum input thereof so as to provide an output partial sum at said partial sum output thereof;

wherein said processor elements in the rows of said N×N array including first and second ones of said calculating means, a 3:2 compressor receiving said mean absolute difference from said first and second ones of said calculating means and said input partial sum, and a high speed adder receiving sum and carry outputs of said 3:2 compressor, said 3:2 compressor and said high speed adder serving as said adding means which provides said output partial sum said memory management unit including M memory bank units which serve as said output bus lines, each of said memory bank units having an input connected to output of a preceding one of said memory bank units so that the search data therein can be replaced by the search data in the preceding one of said memory bank units;

each of said memory bank units including interleaved first and second stream memory banks, said first stream memory bank storing non-boundary search data of a current search area and boundary search data of a succeeding search area, said second stream memory bank storing boundary search data of the current search area and non-boundary search data of the succeeding search area, each of said memory bank units further including multiplexer means connected to said first and second stream memory banks and operable so as to simultaneously provide one of the non-boundary search data and one of the boundary search data to said N×N array.

23. The full-search block matching motion estimation processor as claimed in claim 22, wherein said calculating means or each of said processor elements includes a multiplexer unit which receives said one of the non-boundary search data and said one of the boundary search data from said multiplexer means of one of said memory bank units.

* * * * *